United States Patent

Preston et al.

[11] Patent Number: 5,839,545
[45] Date of Patent: Nov. 24, 1998

[54] BRAKE WEAR SENSOR SYSTEM WITH MOUNTING CLIP

[76] Inventors: David M. Preston, 4551 Ennismore, Clarkston, Mich. 48346; G. Clark Fortune, 34746 Bunker Hill Dr., Farmington Hills, Mich. 48331

[21] Appl. No.: 863,651

[22] Filed: May 27, 1997

[51] Int. Cl.$^6$ .............................. F16D 66/02; B60R 25/10
[52] U.S. Cl. ...................................... 188/1.11 L; 340/454
[58] Field of Search ........................ 188/1.11 L, 1.11 W; 354/454; 116/208; 73/129, 130

[56] References Cited

U.S. PATENT DOCUMENTS

| | | |
|---|---|---|
| 2,731,619 | 1/1956 | Fratus . |
| 2,814,684 | 11/1957 | De Pascale . |
| 3,297,985 | 1/1967 | Trebonsky . |
| 3,440,604 | 4/1969 | Phillips . |
| 3,689,880 | 9/1972 | McKee et al. . |
| 3,800,278 | 3/1974 | Jaye et al. . |
| 4,016,533 | 4/1977 | Ishikawa et al . |
| 4,147,236 | 4/1979 | Steffeu et al. ....................... 188/1.11 L |
| 4,188,613 | 2/1980 | Yang et al. . |
| 4,231,012 | 10/1980 | Volan ................................. 188/1.11 L |
| 4,274,511 | 6/1981 | Moriya . |
| 4,298,857 | 11/1981 | Robins . |
| 4,318,457 | 3/1982 | Dorsch et al. . |
| 4,344,509 | 8/1982 | Harmer . |
| 4,562,421 | 12/1985 | Duffy . |
| 4,685,540 | 8/1987 | Rath et al. ............................. 88/1.11 L |
| 4,869,350 | 9/1989 | Fargier et al. . |
| 5,133,431 | 7/1992 | Braun . |

FOREIGN PATENT DOCUMENTS

| | | |
|---|---|---|
| 0 273 801 A1 | 1/1987 | European Pat. Off. . |
| 2 086 501 | 5/1982 | United Kingdom . |
| 2 107 013 | 4/1983 | United Kingdom . |

*Primary Examiner*—Robert J. Oberleitner
*Assistant Examiner*—Chris Schwartz
*Attorney, Agent, or Firm*—Longacre & White

[57] ABSTRACT

A brake wear sensor and a mounting clip for retaining the brake wear sensor to a brake table. A housing assembly contains a conductive wire to be worn as the brake pad wears a predetermined amount. The housing assembly partially passes through an opening slot in a brake table. A spring clip is provided to positively secured to the housing assembly to the brake table. The spring clip has clip arms which deform inwardly to pass through the opening slot and spring back to prevent reverse passage. The spring clip is also provided with preload springs to force the housing assembly against the brake table. When assembled, the housing assembly and spring clip are positively secured to the brake table.

14 Claims, 4 Drawing Sheets

BRAKE WEAR SENSOR SYSTEM WITH MOUNTING CLIP

BACKGROUND OF THE INVENTION

1. Field of the Invention

The present invention relates to a brake shoe wear sensor and more specifically to a mounting clip for retaining a brake shoe wear sensor where a plurality of locating elements are used to secure the sensor into the brake table.

2. Description of the Prior Art

There are several brake wear sensors in the prior art which are typically shown mounted on the underside of the brake shoe table and extend into the brake shoe material. It is known to embed in the friction material of the brake shoes an electrical sensor to signal to the operator when brake servicing is required. One such type of sensor is a single length of wire which is eventually worn through by the friction of the brake drum when the brake shoe reaches its service limit. Several prior art methods of securing the wire in place within the brake shoe friction material have been disclosed. The mounting technologies most commonly shown involve a threaded fastener enclosing or formed in the brake wear sensor for positioning within a cavity found in the brake shoe friction material. Examples of such mounting systems are disclosed in U.S. Pat. Nos. 3,800,278; 2,814,684; 2,731,619; 4,188,613 and 3,297,985. The majority of these retaining systems make use of threaded elements to provide a crush force on the brake table to retain the sensor in place. Other prior art methods of retaining a brake wear sensor include fittings that are later deformed to provide retention in the brake shoe or brake table. Examples of such systems are shown in U.S. Pat. Nos. 3,440,604 and 3,689,880.

Another known method to retain a brake wear sensor in the brake table is to incorporate a clip mechanism in the sensor housing which eliminates the need to provide threads on at least two elements. Examples of such prior art clip design are shown in U.S. Pat. Nos. 4,298,857; 4,869,350; 4,318,457; 4,274,511; 4,344,509 and 5,133,431. The disclosures of which are hereby incorporated by reference. A spring clip formed in the sensor housing supports the wear sensor in the brake table using an interference fit established by the deformation of the spring clip upon insertion.

The problem with these clip systems is primarily a packaging limitation where it is desirable to firmly fix a wire loop between two brake shoes mounted on a common brake table. It would be desirable to use a clip that would fit between the two shoes using a stamped opening in the brake table that does not extend beyond the areas occupied by the brake shoe. It is also desirable to use one clip to provide retention and an axial preload on the system.

SUMMARY OF THE INVENTION

Figure 1:
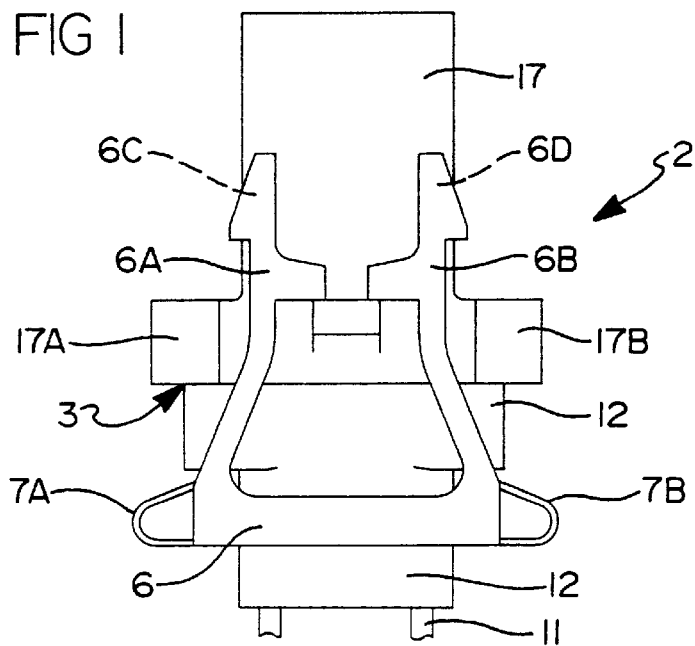
FIG. 1 is a front elevational view of the brake wear sensor of the present invention.

The present invention is directed to a brake wear sensor and a mounting clip for retaining the brake wear sensor to a brake table. A housing assembly contains a conductive wire to be worn as the brake pad wears a predetermined amount. The housing assembly partially passes through an opening slot in a brake table. A spring clip is provided to positively secured to the housing assembly to the brake table. The spring clip has clip arms which deform inwardly to pass through the opening slot and spring back to prevent reverse passage. The spring clip is also provided with preload springs to force the housing assembly against the brake table. When assembled, the housing assembly and spring clip are positively secured to the brake table.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and future modifications in the illustrated device, and such further applications of the principles of the invention as illustrated therein being contemplated as would normally occur to one skilled in the art to which the invention relates.

Now referring to FIG. 1, a front elevational view of the sensor housing 12 of the brake wear sensor 2 of the present invention is shown. The sensor housing 12 is molded using a high temperature material suitable for use in a vehicle brake environment. Many suitable materials are known to those skilled in the art. A channel 10 (see FIG. 3) is formed in the interior of the sensor housing 12 to allow a wire conductor 11 to pass there through. The housing cap 17 (see FIG. 2) is secured to the sensor housing 12 after installation of the wire conductor 11 in channel 10. The sensor housing 12 and the housing cap 17 could be made as one piece forming a sensor assembly 3 having the channel 10 formed therein. The housing cap 17 secures the wire conductor 11 in position and environmentally protects the wire conductor 11. Mounting ears 17A and 17B extend from the housing cap 17 to facilitate positioning against a brake table.

Figure 4:
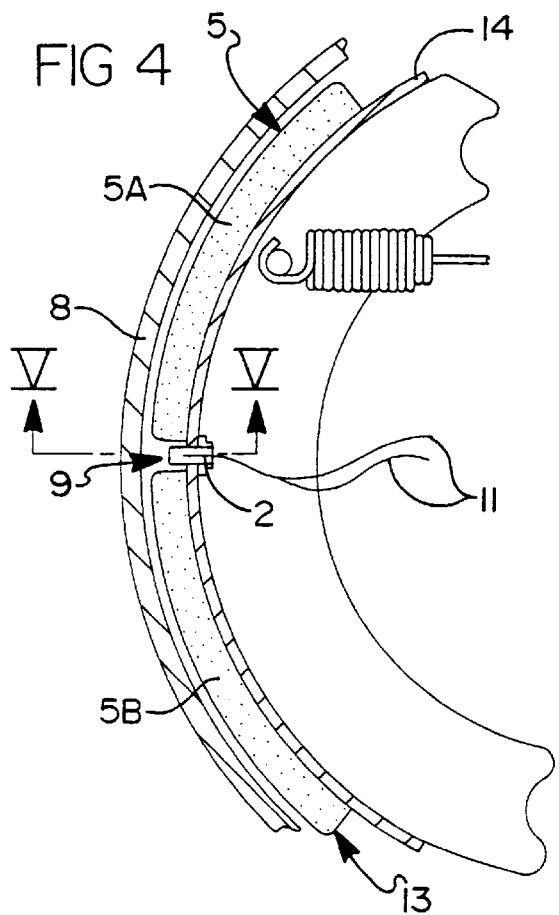
FIG. 4 is a partial cross-sectional view of the brake wear sensor of the present invention mounted to a brake table.
Figure 5:
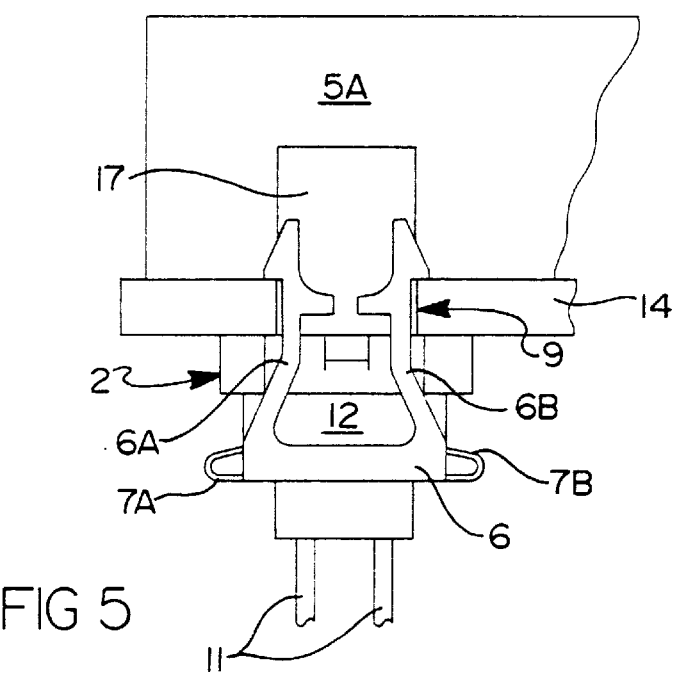
FIG. 5 is a partial cross-sectional view of the brake wear sensor of FIG. 4 taken along line V—V.

The spring clip 6 includes a first front clip arm 6A and an opposing first rear clip arm 6C and a second front clip arm 6B and an opposing second rear clip arm 6D which contain the sensor housing 12 and housing cap 17 for engagement with a brake table 14 through an opening slot 9 (see FIGS. 4 and 5). The first front clip arm 6A and the first rear clip arm 6C could be combined into one first clip arm that engages the brake table 14 (see FIG. 4). In a similar manner, the second front clip arm 6B and the second rear clip arm 6D could be combined into one second clip arm that engages the brake table 14 (see FIG. 4).

A first preload spring 7A and second preload spring 7B extend from the spring clip 6 and engage the sensor housing 12 in a manner to apply a compressive force on the sensor housing 12 and housing cap 17 when the wear sensor 2 is mounted into the opening slot 9 in the brake table 14 (see FIG. 5).

Figure 2:
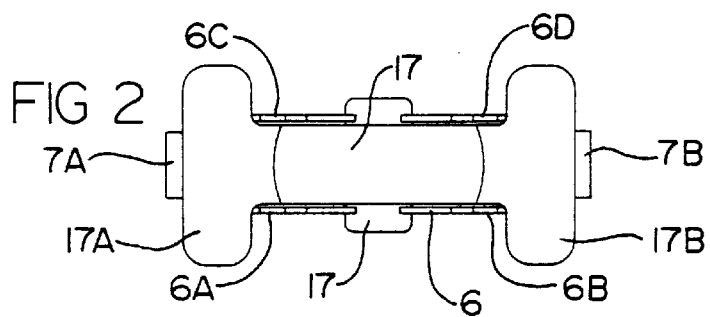
FIG. 2 is a top elevational view of the brake wear sensor of the present invention.

FIG. 2 is a top elevational view of the brake wear sensor 2 of the present invention showing its rectangular shape that is designed to occupy the limited space between brake shoes 5A and 5B. A rectangular opening slot 9 just larger than the rectangular cross section of the sensor housing 12 is formed in the brake table 14 orientated to lie between the brake shoes 5A and 5B (see FIG. 4). The brake wear sensor 2 is inserted into this rectangular slot so that the spring clip arms 6A and 6B compress and then expand to engage the edge of the rectangular slot. At this point, the first and second preload springs 7A and 7B are compressed which thereby finally hold the brake wear sensor 2 in position. Preferably, the brake wear sensor 2 is located toward the inboard side of the brake table 14 (see FIG. 4) to facilitate electrical connection.

Figure 3:
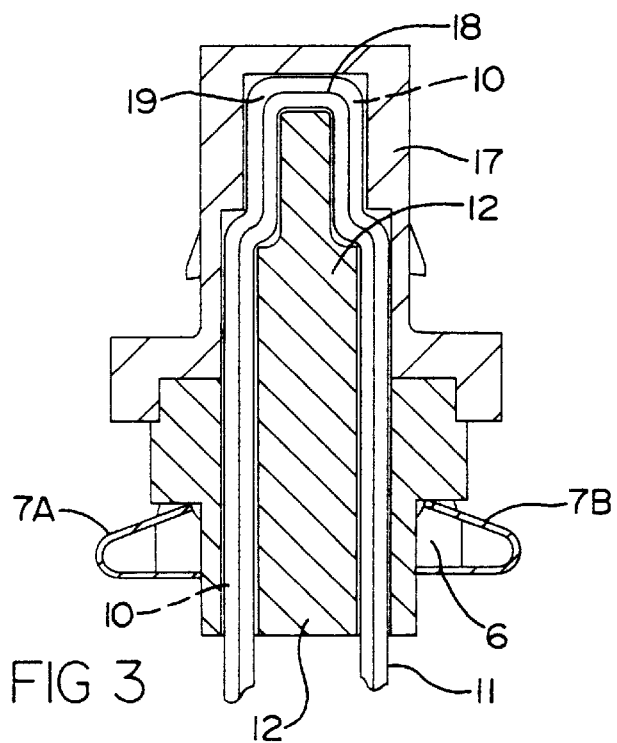
FIG. 3 is a cross-sectional view of the brake wear sensor of the present invention.

FIG. 3 is a partial cross-sectional view of the brake wear sensor 2 of FIG. 4 of the present invention. FIG. 3 more clearly illustrates the conductor cavity 10 formed in the sensor housing 12 and by the housing cap 17 when fitted on the sensor housing 12. The spring clip 6 fits over the sensor housing 12 and has first and second preload springs 7A and 7B which contact the underside of the brake table 14 to apply a load to the brake wear sensor 2 for improved retention and proper positioning relative to the brake friction pads 5A and 5B (see FIG. 4). The conductor 11 is fitted into the conductor cavity 10 and consists of a wire 18 covered by an insulating layer 19. The insulating layer 19 functions to protect the wire 18 from premature wear due to environmental conditions inside the vehicle brake. The conductor 11 eventually wears to the point that the wire 18 breaks and is no longer electrically conductive.

Now referring to FIG. 4, a partial cross-sectioned view of the brake wear sensor 2 of the present invention mounted to a brake table 14 of brake shoe 13 is shown. A spring clip 6 has a first front clip arm 6A and a second front clip arm 6B and correspondingly a first rear clip arm 6C and a second rear clip arm 6D which engage the brake table 14 at opening slot 9 positioned on an inboard side of the brake table 14 and is retained in position so as to compress the first and second preload springs 7A and 7B which are formed as part of the spring clip 6. A sensor housing 12 is formed to provide a channel 10 for wire conductor 11 which is to be worn away when the brake friction pads 5A and 5B wear to a service limit condition. The spring clip 6 sits over and capture the sensor housing 12 and functions to retain it in the brake table 14 at the proper depth relative to the brake friction pads 5A and 5B which are secured to the brake table 14 and frictionally interact with the brake drum 8. The brake friction pads 5A and 5B could be comprised of one single continuous brake friction pad having an opening formed therein over the opening slot 9.

A housing cap 17 is adapted to cover the end of the sensor housing 12 and the severance section 18 of the conductor 11. The housing cap 17 protects the conductor 11 from elements that might compromise the integrity of the conductor 11 especially of the severance section 18. As the brake friction pads 5A and 5B wear to a sufficient degree, the housing cap 17 is also worn. First the housing cap 17 is worn and subsequently the severance section 18 of the conductor 11 wears to the point that electrical continuity is lost which signals the need for brake service.

FIG. 5 is a partial cross-sectional view of the brake wear sensor 2 shown in FIG. 4 taken along line V—V. The first and second preload springs 7A and 7B have been compressed against the sensor housing 12 thereby providing a compressive load on the sensor housing 12 and a portion of the housing cap 17 which is important for the durability of molded high temperature plastics. The first preload spring 7A reacts against the first front clip arm 6A and the first rear clip arm 6C while in an identical fashion the preload spring 7B reacts against the second front clip arm 6B and the second rear clip arm 6D. The clip arms 6A,6B,6C and 6D contact the edge of the opening slot 9 formed in the brake table 14 and hold the brake wear sensor 2 securely in position relative to the brake friction pads 5A and 5B. As the brake friction pads 5A and 5B wear, the housing cap 17 begins to wear and eventually the conductor 11 wears through signaling that the service limit of the brake friction pads 5A and 5B has been reached.

Figure 6:
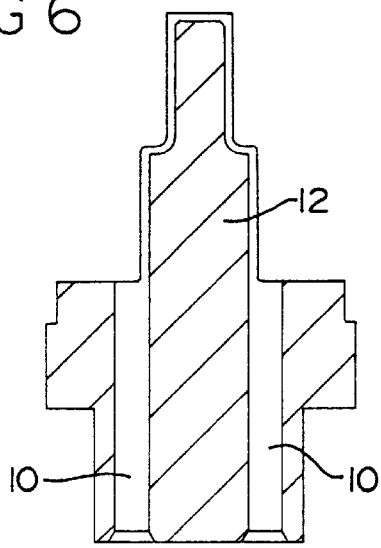
FIG. 6 is a cross-sectional view of the sensor housing of the brake wear sensor of the present invention.

Now referring to FIG. 6, a top cross-sectional view of the sensor housing 12 of the brake wear sensor 2 of the present invention is shown. The sensor housing 12 has a rectangular cross-sectional shape to fit between the brake friction pads 5A and 5B in the rectangular opening 9 formed in the brake table 14. This design provides for adequate support of the wire conductor 11 while minimizing the required modification to the brake shoe 13. The preload spring end 6C and 6D press against the underside of the brake table 14 to provide a preload on the first and second clip arms 6A and 6B for improved retention and axial positioning relative to the brake friction pads 5A and 5B.

Figure 7:
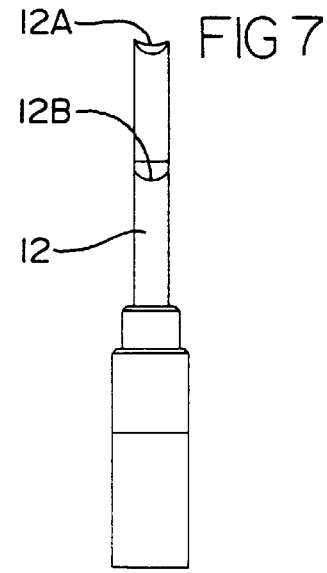
FIG. 7 is a side elevational view of the sensor housing of the brake wear sensor of the present invention.

Now referring to FIG. 7, a side elevational view of the sensor housing 12 is shown where the curved sections 12A and 12B are formed in the sensor housing 12 to accommodate the conductor 11. Conductor 11 (not shown) is a section of electrical wire 18 which has an insulating layer 19. The housing cap 17 and the insulation of conductor 11 provide protection to the wire to improve its integrity by preventing premature wear through (from action of the drum 8) in the harsh environment of a vehicle brake wherein corrosive chemicals could cause premature wear-through of the conductor 11. Both the housing cap 17 and the insulation are required because the conductor 11 is not embedded in the brake pad material and is unprotected once the housing cap 17 is worn through by the brake drum 8.

Figure 8:
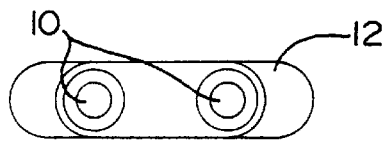
FIG. 8 is an end elevational view of the sensor housing of the brake wear sensor of the present invention.

FIG. 8 is a bottom elevational view of the sensor housing 12 of the present invention more clearly showing the channels 10 through which the conductor 11 passes.

Figure 9:
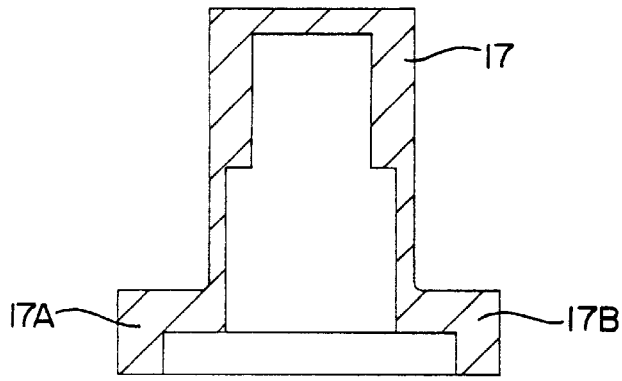
FIG. 9 is a cross-sectional view of the housing cap of the brake wear sensor of the present invention.

FIG. 9 is a cross-sectional view of the housing cap 17 of the present invention where its interim shape forms to the sensor housing to form the channel 10. The housing cap 17 snaps over the sensor housing 12 after installation of the conductor 11.

Figure 10:
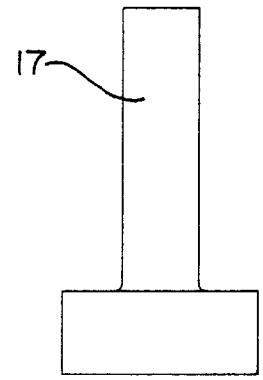
FIG. 10 is a side elevation view of the housing cap of the brake wear sensor of the present invention.

FIG. 10 is a side elevational view of the housing cap 17 of FIG. 9 showing the relatively narrow profile of housing cap 17 for mounting in the narrow opening slot 9 formed in the brake table 14 between the brake friction pads 5A and 5B (see FIG. 4).

Figure 11:
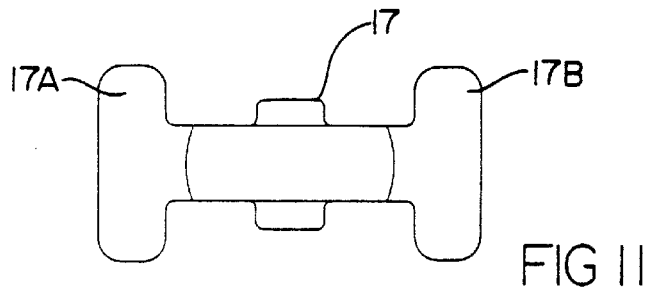
FIG. 11 is an end elevational view of the housing gap of the brake wear sensor of the present invention.

FIG. 11 is a bottom elevational view of the housing cap 17 of FIG. 9 again showing the narrow profile of the housing cap 17 and the mounting ears 17A and 17B which contact the underside of the brake table 14 to restrain the brake wear sensor 2 in the opening slot 9 formed in the brake table 14 using the spring clip 6.

Figure 12:
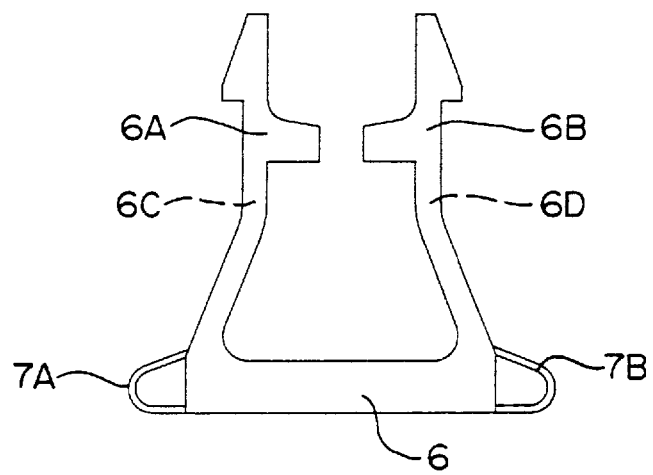
FIG. 12 is a front elevational view of the spring clip of the present invention.

Now referring to FIG. 12, a front elevational view of the spring clip 6 of the brake wear sensor 2 of the present invention is shown. The spring clip 6 is made of a resilient material such as steel or plastic, either of which must be selected to withstand the environment experienced by a brake shoe without losing holding force. Four preload clip arms are clearly shown as the first front clip arm 6A and the second front clip arm 6B and the first rear clip arm 6C and the second rear clip arm 6D. All of the clip arms 6A, 6B, 6C and 6D flex to allow the brake sensor to be inserted into and engage the brake table 14. The first and second preload springs 7A and 7B are compressed as the brake sensor 2 is pressed into the brake table 14 and provide a retention force on the clip arms 6A, 6B, 6C and 6D against the brake table 14.

Figure 13:
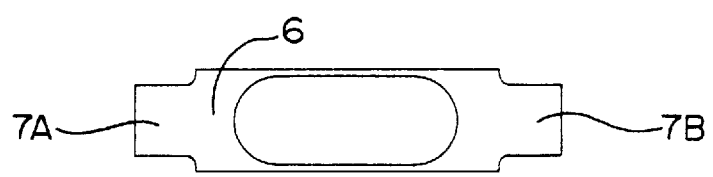
FIG. 13 is a bottom elevational view of the spring clip of the present invention.

Now referring to FIG. 13, a bottom elevational view of the spring clip 6 of the brake wear sensor 2 of the present invention is shown.

The description above refers to particular embodiments of the present invention and it is understood that many modifications may be made without departing from the spirit thereof. The embodiments of the invention disclosed and described in the above specification and drawings are presented merely as examples of the invention. Other embodiments, materials, forms and modifications thereof are contemplated as falling within the scope of the present invention only limited by the claims as follows.

We claim:

1. A brake wear sensor for first and second brake pads mounted to a brake table of a vehicle brake assembly, the sensor designed to be mounted through an opening slot formed in the brake table between the first and second brake pads so that an electrical conductor forming a part of the wear sensor is rubbed against by a rotating brake drum when the first and second brake pads reach a thickness less than a predetermined limit, the wear sensor comprising:

a sensor housing;

a housing cap adapted to fit over a portion of said sensor housing thereby forming a channel for allowing the conductor to be passed therethrough, said conductor is disposed in said channel between said sensor housing and said housing cap;

a spring clip adapted to retain said sensor housing cap in proper position relative to said brake table, said spring clip having at least one clip arm engaging said brake table to prevent movement in one direction and at least one preload spring engaging said housing cap to prevent movement in an opposite direction, said spring clip thereby providing positive retainment of said sensor housing and said housing cap to said brake table.

2. The brake wear sensor of claim 1, wherein said at least one clip arm is comprised of a first clip arm and a second clip arm adapted to engage said opening slot.

3. The brake wear sensor of claim 2, wherein said at least one preload spring comprises a first preload spring extending from said first clip arm and a second preload spring extending from said second clip arm, said first and second preload springs engage said sensor housing thereby providing an axial preload urging said sensor housing and said housing cap toward said brake table.

4. The brake wear sensor of claim 2, wherein said first clip arm is comprised of a first front clip arm and a first rear clip arm, and said second clip arm is comprised of a second front clip arm and a second rear clip arm.

5. The brake wear sensor of claim 1, wherein said opening slot is located on an inboard side of said brake table.

6. The brake wear sensor of claim 1, wherein said conductor is comprised of a conducting wire coated with an insulating material.

7. The break wear sensor according to claim 1, wherein said spring clip is formed of a unitary body.

8. A brake wear sensor for a brake assembly with a brake table having at least one brake friction pad attached thereto and having an opening slot formed therein comprising:

a sensor housing;

a housing assembly having a channel formed therein adapted to pass partially through said opening slot in said brake table;

a spring clip having at least one preload spring and at least one clip arm, said clip arm adapted to clip onto said brake table at said opening slot, and said preload spring contacting said sensor housing to apply a compressive force between said sensor housing and said brake table;

a conductor disposed within said channel and located relative to said brake table to be severed when said brake friction pads wear to a predetermined thickness;

wherein said at least one clip arm is comprised of a first front clip arm and a first rear clip arm and a second front clip arm and a second rear clip arm where said clip arms are adapted to engage said brake table at said opening slot to capture a portion of a housing cap and said sensor housing between said preload spring and said brake table.

9. The brake wear sensor of claim 8, wherein said at least one preload spring comprises a first preload spring extending from said first front clip arm and said first rear clip arm and a second preload spring extending from said second front clip arm and said second rear clip arm.

10. The brake wear sensor of claim 9, wherein said first preload spring and said second preload spring are leaf springs.

11. A brake wear sensor for a brake assembly with a brake table having at least one brake friction pad attached thereto and having an opening slot having an axis extending from a first side to a second side of said brake table said brake wear sensor comprising:

a housing assembly having a channel formed therein adapted to pass partially through said opening slot in said brake table;

a integral spring clip having at least one preload spring and at least one clip arm, said clip arm adapted to clip onto said first side of said brake table at said opening slot preventing relative movement of said housing assembly with respect to said brake table in a first direction parallel to said axis, and said preload spring contacting said sensor housing assembly to apply a compressive force urging a portion of said housing assembly in a second direction opposite said first direction against said second side of said brake table thereby providing positive retainment of said housing assembly to said brake table; and a conductor disposed within said channel and located relative to said brake table to be severed when said brake friction pads wear to a predetermined thickness.

12. The brake wear sensor of claim 11, wherein said opening slot is rectangular.

13. The brake wear sensor of claim 11, wherein said housing assembly is comprised of a sensor housing and a housing cap adapted to engage said sensor housing to form said channel.

14. A brake wear sensor assembly adapted to be mounted through an opening slot extending from a first side to a second side of a brake table and positively secured thereto, said assembly comprising:

a housing cap having a portion extending through said opening slot and having at least one outwardly extending mounting ear to prevent said housing cap from passing through said opening slot and facilitate positioning with respect to said brake table;

a sensor housing disposed within said housing cap;

a conductor wire at least partially disposed within said housing cap between said sensor housing and said housing cap;

a unitary spring clip having at least one clip arm engaging said second side of said brake table thereby preventing passage therethrough, said at least one clip arm adapted to deform inwardly to facilitate passage through said opening slot and thereafter spring back to prevent return passage, said spring clip further including at least one preload spring positively engaging a portion of said sensor housing thereby providing an axial preload to urge said sensor housing toward and said at least one mounting ear of said housing cap against said first side of said brake table, said spring clip thereby providing positive retainment of said sensor housing and said housing cap to said brake table.

* * * * *